United States Patent [19]
Jager et al.

[11] 3,989,692
[45] Nov. 2, 1976

[54] REACTIVE DYESTUFFS

[75] Inventors: Horst Jager, Leverkusen; Manfred Groll, Cologne, both of Germany

[73] Assignee: Bayer Aktiengesellschaft, Leverkusen, Germany

[22] Filed: July 19, 1974

[21] Appl. No.: 490,008

Related U.S. Application Data

[63] Continuation of Ser. No. 335,248, Feb. 23, 1973, abandoned.

[30] Foreign Application Priority Data
Feb. 23, 1972 Germany............................ 2208475

[52] U.S. Cl.................................. 260/242; 8/1 D; 8/1 E; 8/1 XA; 8/42 R; 8/50; 8/51; 8/54.2; 8/62; 8/63; 8/178 R; 260/249.5; 260/249.8; 260/250 Q; 260/250 A; 260/250 B; 260/256.5 R

[51] Int. Cl.².................. C07D 203/12; C09B 47/04
[58] Field of Search..... 260/250 A, 250 B, 256.5 R, 260/250 Q, 242

[56] References Cited
UNITED STATES PATENTS

| | | | |
|---|---|---|---|
| 3,082,207 | 3/1963 | Koller.............................. | 260/314.5 |
| 3,126,369 | 3/1964 | Hensel et al...................... | 260/314.5 |
| 3,133,059 | 5/1964 | Clark et al....................... | 260/314.5 |
| 3,184,284 | 5/1965 | Kissa............................... | 260/314.5 |
| 3,232,931 | 2/1966 | Rothman......................... | 260/314.5 |
| 3,268,548 | 8/1966 | Heyna et al...................... | 260/314.5 |
| 3,336,283 | 8/1967 | Weissauer........................ | 260/242 |
| 3,342,797 | 9/1967 | Guenthard........................ | 260/242 |
| 3,445,449 | 5/1969 | Meininger et al................. | 260/314.5 |
| 3,458,496 | 7/1969 | Guenthard........................ | 260/242 |
| 3,511,826 | 5/1970 | Tosan et al....................... | 260/299 |
| 3,515,713 | 6/1970 | Siegel et al....................... | 260/299 |
| 3,625,936 | 12/1971 | Meininger et al................ | 260/314.5 |
| 3,627,749 | 12/1971 | Ackermann et al............. | 260/314.5 |
| 3,669,951 | 6/1972 | Bien et al......................... | 260/242 |
| 3,674,783 | 7/1972 | Tobel............................... | 260/242 |

FOREIGN PATENTS OR APPLICATIONS 1,121,711   7/1968   United Kingdom.............. 260/314.5

OTHER PUBLICATIONS

Venkataraman, Synthetic Dyes, pp. 814 and 1220 (1952).

Primary Examiner—John D. Randolph
Attorney, Agent, or Firm—Plumley and Tyner

[57] ABSTRACT

Phthalocyanine reactive dyestuffs of the formula

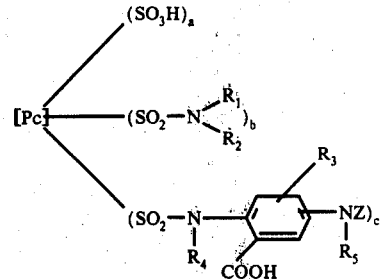

wherein Pc, $R_1$, $R_2$, $R_3$–$R_5$, a, b and c and Z have the meaning given in the description. They are outstandingly suitable for dyeing and printing materials containing cellulose, such as natural and regenerated cellulose, in accordance with the techniques known for the purpose. The new dyestuffs are also suitable for dyeing materials containing amide groups, such as wool, silk and synthetic polyamides. Dyeings obtained on textile cellulose, in particular, distinguish themselves by very good fastness properties, especially fastness to light and to wet processing.

7 Claims, No Drawings

REACTIVE DYESTUFFS

This is a Continuation, of application Ser. No. 335,248, filed Feb. 23, 1973, now abandoned.

The present invention relates to valuable new phthalocyanine reactive dyestuffs of the general formula

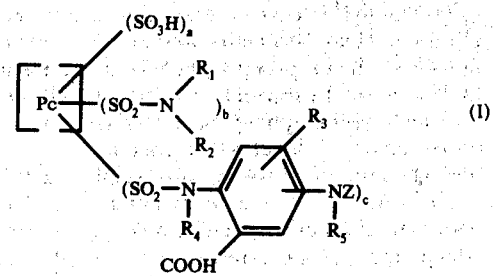

wherein
Pc denotes the radical of a phthalocyanine,
$R_1$ and $R_2$ denote hydrogen or together denote an alkylene radical which is optionally interrupted by hetero-atoms, or alkyl, cycloalkyl, aralkyl or aryl,
$R_3$ denotes hydrogen or a substituent,
$R_4$ and $R_5$ denote hydrogen or a substituent and
Z denotes a reactive group,
a and c represent a number from 1 to 3 and b represents a number from 0 to 2, with $a + b + c \leq 4$, as well as their manufacture and use for dyeing and printing natural and synthetic fibre materials.

In dyestuffs of the formula (I) each sulphonic acid group or sulphonamide group is bonded to a different benzene ring of the phthalocyanine in the 3- or 4-position. The phthalocyanine radical Pc can be free of metal but preferably contains metal. Possible metals are cobalt, nickel and copper. The alkyl, cycloalkyl, aralkyl and aryl radicals can possess further substituents.

$R_3 - R_5$ preferably represent hydrogen.

Suitable alkyl radicals are, in particular, $C_1 - C_5$-alkyl radicals, such as methyl, ethyl, propyl, butyl and amyl, which can optionally be substituted, for example by OH, COOH or $SO_3H$, such as β-hydroxyethyl, γ-hydroxypropyl, β,γ-dihydroxypropyl and pentahydroxyhexyl, β-carboxyethyl and β-sulphoethyl. Suitable cycloalkyl radicals are in particular cyclohexyl, suitable aralkyl radicals are in particular benzyl radicals which are optionally substituted further, and suitable aryl radicals are in particular phenyl and naphthyl, chlorophenyl, methoxyphenyl, sulphophenyl and carboxyphenyl. $R_1$ and $R_2$ can together also represent, for example, —$CH_2CH_2OCH_2CH_2$— or —$CH_2CH_2CH_2CH_2CH_2$—.

By reactive groups Z there are understood groups which contain one or more reactive groups or removable substituents which on application of the dyestuffs to cellulose materials in the presence of acid-binding agents and/or under the action of heat are capable of reacting with the hydroxyl groups of cellulose, or on application to polyamide fibres, such as wool, are capable of reacting with the NH groups of these fibres, to form covalent bonds. Such fibre-reactive groupings are known in large numbers from the literature.

Reactive groups which are suitable according to the invention and which contain at least one removable substituent bonded to a heterocyclic radical or to an aliphatic radical are, inter alia, groups which contain at least one reactive substituent bonded to a 5-membered or a 6-membered heterocyclic ring, such as to a monazine, diazine or triazine ring, for example a pyridine, pyrimidine, pyridazine, pyrazine, thiazine, oxazine or asymmetrical or symmetrical triazine ring, or to a ring system of this nature which possesses one or more fused aromatic rings, such as a quinoline, phthalazine, cinnoline, quinazoline, quinoxaline, acridine, phenazine and phenantrhidine ring system; the 5-membered or 6-membered heterocyclic rings which possess at least one reactive substituent are accordingly preferably those which contain one or more nitrogen atoms and can contain fused 5-membered or 6-membered carbocyclic rings. Amongst the reactive substituents on the heterocyclic structure, examples to be mentioned are halogen (Cl, Br or F), ammonium, including hydrazinium, sulphonium, sulphonyl, especially optionally substituted $C_1 - C_5$-alkylsulphonyl and optionally substituted phenylsulphonyl, azido-($N_3$), thiocyanato, thio, thioether, hydroxyether, sulphinic acid and sulphonic acid, Examples to be mentioned in detail are mono- or di-halogeno-sym.-triazinyl radicals, for example, 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6, 2-di-β-hydroxyethylamino-4-chlorotriazinyl-6, and the corresponding sulphuric acid half-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxyphenyl or sulphophenyl)-amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m-or p-methyl- or methoxyphenyl)-oxy-4-chlorotriazinyl-6, 2-alkylmercapto- or 2-arylmercapto- or 2-(substituted aryl)-mercapto-4-chlorotriazinyl-6, such as 2-(β-hydroxyethyl)-mercapto-4-chlorotriazinyl-6, 2-phenylmercapto-4-chlorotriazinyl-6, 2-(4'-methylphenyl)-mercapto-4-chlorotriazinyl-6, 2-(2',4'-dinitro)-phenylmercapto-4-chlorotriazinyl-6,2-methyl-4-chlorotriazinyl-6, 2-phenyl-4-chlorotriazinyl-6, mono-, di- or trihalogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano or -5-vinyl- or -5-sulpho- or -5-mono-, -di- or -trichloromethyl- or -5-carboalkoxy-pyrimidinyl-6, 2,5-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl- or -6-carbonyl, 2,4-dichloroquinazoline-7- or -6-sulphonyl- or -carbonyl, 2- or 3- or 4-(4',5'-dichloropyridazon-6'-yl-1')-phenylsulphonyl- or -carbonyl, β-(4',5'-dichloropyridazon-6'-yl-1')-ethylcarbonyl, N-methyl-N-(2,4-dichlorotriazinyl-6)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, as well as the corresponding bromine and fluorine derivatives of the abovementioned chlorine-substituted heterocyclic radicals, including, for example, 2-fluoro-4-pyrimidinyl, 2,6-difluoro-4-pyrimidinyl, 2,6-difluoro-5-chloro-4-pyrimidinyl, 2-fluoro-5,6dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, and 2,6-difluoro-5-trifluoromethyl-4-pyrimidinyl; triazine radicals containing sulphonyl groups, such as 2,4-bis(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6, and 2,4-bis-(3'-carboxyphenylsulphonyl-1')-triazinyl-6; pyrimidine rings containing sulphonyl groups, such as 2-carboxymethylsulphonyl-pyrimidinyl-4, 2-methylsulphonyl-6-methyl-pyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloropyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethylpyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methylpyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxypyrimidinyl-4, 2-methylsulphonyl-5-chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl, 2,6-bis(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, and 2-methylsulphonyl-4-chloro-6-methylpyrimidine-5-sulphonyl- or -carbonyl; triazine rings containing ammonium groups, such as 2-trimethylammonium-4-phenylamino- or -4-(o-, m- or p-sulphophenyl)-aminotriazinyl-6, 2-(1,1-dimethyl-hydrazinium)-4-phenylamino- or -4-(o-, m- or p-sulphophenyl)-aminotriazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenylamino- or -4-(o-, m- or p-sulphophenyl)-aminotriazinyl-6, and also 4-phenylamino- or 4-(sulphophenylamino)-triazinyl-6 radicals which contain 1,4-bis-aza-bicyclo-[2,2,2]-octane or 1,2-bis-aza-bicyclo-[0,3,3]-octane bonded via a nitrogen bond, as a quaternary structure, in the 2-position, 2-pyridinium-4-phenylamino- or -4-(o-, m- or p-sulphophenyl)-amino-triazinyl-6 as well as corresponding 2-oniumtriazinyl-6 radicals which are substituted in the 4-position by alkylamino, such as methylamino, ethylamino or β-hydroxyethylamino, or alkoxy, such as methoxy or alkoxy, or aroxy such as phenoxy or sulphophenoxy groups; 2-chlorobenzthiazole-5- or -6-carbonyl- or -5- or -6-sulphonyl, 2-arylsulphonyl- or -alkylsulphonylbenzthiazole-5- or -6-carbonyl- or -5- or -6-sulphonyl, such as 2-methylsulphonyl- or 2-ethylsulphonyl-benzthiazole-5- or -6-sulphonyl- or -carbonyl, 2-phenylsulphonyl-benzthiazole-5- or -6-sulphonyl- or -carbonyl- and the corresponding 2-sulphonylbenzthiazole-5- or -6-carbonyl- or -sulphonyl derivatives containing sulpho groups in the fused benzene ring, 2-chlorobenzoxazole-5- or -6-carbonyl- or -sulphonyl, 2-chlorobenzimidazole-5- or -6-carbonyl or -sulphonyl, 2-chloro-1-methylbenzimidazole-5- or -6-carbonyl- or -sulphonyl, 2-chloro-4-methylthiazole-(1,3)-5-carbonyl- or -4- or -5-sulphonyl and the N-oxide of 4-chloro- or 4-nitro-quinoline-5-carbonyl.

Additionally, reactive groups of the aliphatic series should be mentioned, such as acryloyl, mono-, di- or trichloroacryloyl, such as —CO—CH=CH—Cl, —CO—CCl=CH$_2$, —CO—CCl=CH—CH$_3$ and also —CO—CCl=CH—COOH, —CO—CH=CCl—COOH, β-chloropropionyl, 3-phenylsulphonylpropionyl, 3-methylsulphonylpropionyl, 3-phenylsulphonylpropionyl, β-sulphato-ethylaminosulphonyl, vinylsulphonyl, β-chloroethylsulphonyl, β-sulphatoethylsulphonyl, β-methylsulphonyl-ethylsulphonyl, β-phenylsulphonyl-ethylsulphonyl, 2-fluoro-2-chloro-3,3-difluorocyclobutane-1-carbonyl, 2,2,3,3-trifluorocyclobutane-1-carbonyl or -1-sulphonyl, β-(2,2,3,3-tetrafluorocyclobutyl-1)-acryloyl, α- or β-bromoacryloyl, and α- or β-alkyl- or -aryl-sulphonyl-acryloyl groups, such as α- or β-methylsulphonylacryloyl.

The new dyestuffs (I) are manufactured by condensation of suitable starting materials. Preferably, the procedure followed is that in dyestuffs of the formula

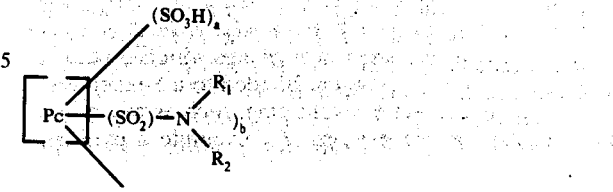

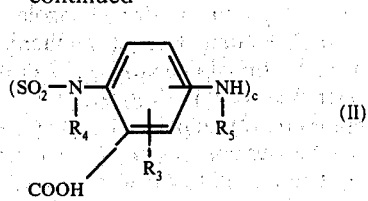

wherein
Pc, $R_1 - R_5$, a, b and c have the meaning indicated in the formula (I),
the terminal group

is converted in a manner which is in itself known, by reaction with suitable at least bifunctional reactive components X-Z, into a grouping

wherein
Z has the indicated meaning and
X represents a removable substituent.
The conversion of the amino group

into the grouping

is generally an acylation reaction which is carried out in an aqueous, aqueous-organic or organic, preferably weakly acid to weakly alkaline, medium at temperatures of, for example, 0°– 80°C.

Reactive components X-Z which are suitable for this purpose are, for example, those on which the above-mentioned reactive groups Z are based, that is to say in general the halides, especially the chlorides, of the acyl components Z which have been mentioned. Amongst the large number of available compounds, the following may be mentioned here as a selection: trihalogeno-sym.-triazines, such as cyanuric chloride and cyanuric bromide, dihalogeno-monamino- and mono-substituted-amino-sym.-triazines, such as 2,6-dichloro-4-aminotriazine, 2,6-dichloro-4-methylaminotriazine, 2,6-dichloro-4-ethylaminotriazine, 2,6-dichloro-4-oxyethylaminotriazine, 2,6-dichloro-4-phenylaminotriazine, 2,6-dichloro-4-(o-, m- or p-sulphophenyl)-aminotriazine, 2,6-dichloro-4-(2′, 3′-, 2′, 4′-, 3′, 4′- or 3′, 5′-disulphophenyl)-aminotriazine, dihalogenoalkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-oxytriazine, dihalogeno-alkylmercapto- and -arylmercapto-sym.-triazines, such as 2,6-dichloro-4-ethylmercapto-triazine, 2,6-dichloro-4-phenylmercaptotriazine, and 2,6-dichloro-4-(p-methylphenyl)-mercaptotriazine; tetrahalogenopyrimidines, such as tetrachloro-, tetrabromo- or tetrafluoro-pyrimidine, 2,4,6-trihalogenopyrimidines, such as 2,4,6-trichloro-, -tribromo- or -trifluoro-pyrimidine, dihalogenopyrimidines, such as 2,4-dichloro-, -dibromo- or -difluoropyrimidine; 2,4,6-trichloro-5-nitro- or -5-methyl- or -5-carbomethoxy- or -5-carboethoxy- or -5-carboxymethyl- or -5-mono-, -di- or -tri-chloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-pyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoro-pyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitropyrimidine, 2,4-difluoro-5-trifluoromethyl-pyrimidine, 2,4-difluoro-5-methylsulphonyl-4-pyrimidine, 2,4-difluoro-5-phenylpyrimidine, 2,4-difluoro-5-carbonamido-pyrimidine, 2,4-difluoro-5-carbomethoxypyrimidine, 2,4-difluoro-6-trifluoromethylpyrimidine, 2,4-difluoro-5-bromo-6-trifluoromethyl-pyrimidine, 2,4-difluoro-6-carbonamido-pyrimidine, 2,4-difluoro-6-carbomethoxy-pyrimidine, 2,4-difluoro-6-phenyl-pyrimidine, 2,4-difluoro-6-cyanopyrimidine, 2,4,6-trifluoro-5-methylsulphonylpyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, and 2,6-dichloropyrimidine-4-carboxylic acid chloride; pyrimidine reactive components with removable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-trismethylsulphonylpyrimidine, 2,6-bis-methylsulphonyl-4,5-dichloropyrimidine, 2,4-bis-methylsulphonylpyrimidine-5-sulphonic acid chloride, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetra-methylsulphonylpyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-tris-methylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4,6-bis-methylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'- or 3'- or 4'-carboxyphenylsulphonyl)-4,5-dichloro-6-methylpyrimidine, 2,4 -bis-(2'-or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyrimidine-5-carboxylic acid chloride or bromide and 2,6-bis-(methylsulphonyl)-4-chloropyrimidine-5-carboxylic acid chloride; examples of further reactive components of the heterocyclic series with reactive sulphonyl substituents are 3,6-bis-phenylsulphonylpyridazine, 3-methylsulphonyl-6-chloropyridazine, 3,6-bistrichloromethylsulphonyl-pyridazine, 3,6-bis-methylsulphonyl-4-methylpyridazine, 2,5,6-tris-methylsulphonylpyrazine, 2,4-bismethylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-tris-phenylsulphonyl-1,3,5-triazine, 2,4-bis-methylsulphonylquinazoline, 2,4-bis-trichloromethylsulphonylquinoline, 2,4-bis-carboxymethylsulphonyl-quinoline, 2,6-bis-(methylsulphonyl)-pyridine-4-carboxylic acid chloride and 1-(4'-chlorocarbonylphenyl- or 2'-chlorocarbonylethyl)-4,5-bis-methylsulphonyl-6-pyridazone; further heterocyclic reactive components with mobile halogen are, amongst others, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride as well as the corresponding bromine compounds, 2,4-dichloroquinazoline-6- or -7-carboxylic acid chloride or -sulphonic acid chloride and the corresponding bromine compounds, 2- or 3- or 4-(4',5'-dichloropyridazon-6'-yl-1')-phenylsulphonic acid chloride or -carboxylic acid chloride as well as the corresponding bromine compounds, β-(4',5'-dichloropyridazon-6'-yl-1')-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl- or -6-carbonyl)-amino-acetyl chloride and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride as well as the corresponding 2-sulphonylbenzthiazole derivatives containing sulphonic acid groups in the fused benzene ring, 3,5-bis-methylsulphonylisothiazole-4-carboxylic acid chloride, 2-chlorobenzoxazole-5- or -6-carboxylic acid chloride or -sulphonic acid chloride as well as the corresponding bromine derivatives, 2-chlorobenzimidazole-5- or -6-carboxylic acid chloride or -sulphonic acid chloride and the corresponding bromine derivatives, 2-chloro-2-methyl-benzimidazole-5- or -6-carboxylic acid chloride or -sulphonic acid chloride as well as the corresponding bromine derivatives, 2-chloro-4-methylthiazole-(1,3)-5-carboxylic acid chloride or -4- or -5-sulphonic acid chloride, 2-chloro-thiazole-4- or -5-sulphonic acid chloride and the corresponding bromine derivatives.

The following examples should be mentioned, amongst the series of the aliphatic reactive components: acrylic acid chloride, mono-, di- or tri-chloroacrylic acid chloride, 3-chloropropionic acid chloride, 3-phenylsulphonyl-propionic acid chloride, 3-methylsulphonyl-propionic acid chloride, 3-ethyl-sulphonyl-propionic acid chloride, 3-chloroethanesulphonyl chloride, chloromethanesulphonyl chloride, 2-chloroacetyl chloride, 2,2,3,3-tetrafluorocyclobutane-1-carboxylic acid chloride, β-(2,2,3,3-tetrafluorocyclobutyl-1)-acrylic acid chloride, β-(2,3,3-trifluoro-2-chloro-cyclobutane-1)-carboxylic acid chloride, β-methylsulphonyl-acrylic acid chloride, α-methyl-sulphonyl-acrylic acid chloride and α-bromoacrylic acid chloride and β-bromoacrylic acid chloride.

If the conversion leads to dyestuffs which possess more than one reactive group in the radical Z or at another position of the dyestuff molecule, these groups can be partly replaced by other radicals, for example amino radicals, which can in turn possess reactive groups, for example in the form of esterified oxalkyl groups. In principle, it is possible for two or more reactive groups which are different from one another to be present in the dyestuff.

The phthalocyanine compounds of the formula (II) used in the process according to the invention can be manufactured by condensing a phthalocyaninesulphonic acid chloride, preferably in the form of an aqueous suspension, which corresponds to the formula

(III)

wherein
Pc has the indicated meaning and
$m = 0 - 2$ and
$n = 1 - 4$, with the sum of m and n being not greater than 4,
with a compound of the formula

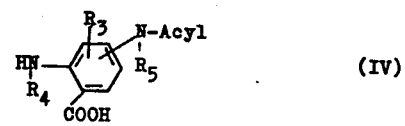
(IV)

wherein

Acyl denotes an acyl group and

R$_3$ – R$_5$ have the meaning indicated in the formula (I) and optionally with a compound of the formula

wherein

R$_1$ and R$_2$ have the abovementioned meaning (in this reaction non-hydrolysed and unreacted sulphonic acid chloride groups can be converted into sulphonic acid groups by hydrolysis) and subsequently splitting off the acyl group.

Suitable acyl groups are, in particular, C$_1$–C$_4$-alkylcarbonyl groups, such as —COCH$_3$.

Phthalocyaninesulphonic acid chlorides of the formula (III) can be obtained by treating the corresponding phthalocyanine or the phthalocyaninesulphonic acid with chlorosulphonic acid, if necessary in the presence of carbon tetrachloride or of an acid halide, such as thionyl chloride, sulphuryl chloride, phosphorus pentachloride, phosphorus oxychloride and phosphorus trichloride, as described in British Patent Specifications 708,543, 784,034 and 785,629 and in U.S. Pat. No. 2,219,330.

Examples of suitable amines of the formula (IV) are 1-amino-2-carboxy-4-acetylamino- or 5-acetylaminobenzene.

Examples of amines of the formula (V) are ammonia, methylamine, ethylamine, propylamine, taurine, N-methyltaurine, aminoacetic acid, sarcosine, ethanolamine, diethanolamine, morpholine, benzylamine, aniline, m-sulphanilic acid, p-anisidine and 4-aminobenzoic acid.

The reaction of the phthalocyaninesulphonic acid chloride with the compound of the formula (IV) and the compound of the formula (V) can be carried out in a single reaction step or in separate steps. In general, a simultaneous reaction (in the case that b is to be greater than 0) is of advantage. Here, a compound of the formula (V) can serve as the acid-binding agent.

Compounds of the formula (I) can also be obtained by condensing phthalocyaninesulphonic acid and -sulphonic acid chlorides of the formula (III)

wherein

Pc, m and n have the indicated meaning with compounds of the formula

wherein

Z, R$_4$ and R$_5$ have the indicated meaning, in aqueous suspension and in a neutral pH range. In this reaction, again, non-hydrolysed and unreacted sulphonic acid chloride groups can be converted into sulphonic acid groups by hydrolysis. This process shows some disadvantages compared to the first-mentioned process. Thus it presupposes that the diaminobenzoic acids of the formula

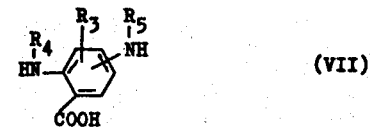

can be selectively acylated with reactive components X-Z, wherein

X and Z have the indicated meaning at the —NH$_2$ group which is in the m- or p-position to the carboxyl group. Furthermore there is the danger, in the condensation of (III) with (VI), that complete reaction does not take place. This is particularly unfavourable if expensive reactive components are concerned. If reactive groups which are particularly reactive are involved, the simultaneous reaction with compounds of the formula

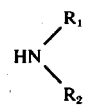

wherein

R$_1$ and R$_2$ have the indicated meaning is inadvisable since in that case a reaction between compounds of the formula

and of the formula

is to be feared.

The dyestuffs obtainable in accordance with the process are new. They are outstandingly suitable for use as reactive dyestuffs for dyeing and printing materials containing cellulose, such as natural and regenerated cellulose, in accordance with the techniques known for the purpose, for example in accordance with the pad-cold batch process, the padsteam process and the pad-fixing process, and for dyeing from a dilute liquor.

The new dyestuffs are also suitable for dyeing materials containing amide groups, such as wool, silk and synthetic polyamides.

On textile materials containing cellulose, in particular, the new dyestuffs gave extremely valuable prints and dyeings which are distinguished by their strong, principally turquoise-blue, colour shades and very good fastness properties, especially fastness to light and to wet processing.

In the examples which follow, the temperature data represent degrees Centigrade.

Formulae given in the description are those of the free acids. Dyestuffs are preferably used in form of their salts, especially of the alkaline salts, especially of the sodium salts.

EXAMPLE 1

97 parts of the copper phthalocyaninetetrasulphonyl chloride manufactured in a known manner (see DAS (German Published Specification) No. 1,205,639, Example 1) by post-treatment with thionyl chloride are suspended in 1,000 parts of ice water and neutralised with sodium hydroxide solution. 38.8 parts of 1-amino-2-carboxy-4-acetaminobenzene are dissolved in 200 parts of water at pH 9. This solution is added to the aqueous suspension of the copper phthalocyaninetetrasulphonyl chloride, the mixture is warmed to 20° and the condensation is completed at this temperature, whilst maintaining a pH of 9 by dropwise addition of sodium hydroxide solution. The determination if nitrite shows that approx. 75% of the amine employed have reacted. The dyestuff present in solution has the following average composition:

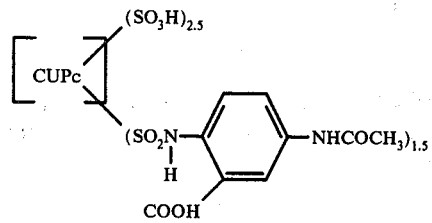

To split off the acetylamino group, sufficient sodium hydroxide is added to produce an approx. 2 N sodium hydroxide solution and the mixture is then warmed for 1 hour to 90° – 95°. After cooling, the solution is adjusted to pH 9 by adding concentrated hydrochloric acid and the dyestuff is separated out by means of 20% by volume of sodium chloride and filtered off.

For acylation, the moist paste is dissolved in 1,000 parts of ice water. 25 parts of 2,4,6-trifluoro-5-chloropyrimidine are added dropwise at pH 8 and 5°. The pH is kept constant by simultaneously adding 10% strength sodium carbonate solution. After completion of the acylation, the dyestuff is salted out by means of 10% by volume of sodium chloride. After filtering off, drying and grinding a blue powder which is easily soluble in water is obtained. In the form of the free acid, the dyestuff corresponds to the following formula:

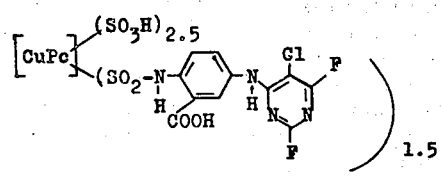

PRINTING INSTRUCTION

Mercerised cotton satin is printed with a printing paste of the following composition:

| | |
|---|---|
| 30 | parts of the dyestuff obtained according to Example 1 |
| 100 | parts of urea |
| 395 | parts of water |
| 450 | parts of a 3% strength sodium alginate thickener |
| 10 | parts of sodium 1-nitrobenzene-3-sulphonate |
| 15 | parts of sodium bicarbonate |
| 1,000 | parts |

The dried textile material is steamed for 10 – 15 minutes at 102° – 104° and subsequently rinsed cold and warm. After soaping at the boil, with subsequent renewed rinsing and drying, a greenish-tinged turquoise print of very good fastness to light and to wet processing is obtained.

PADDING INSTRUCTION 30 parts of the dyestuff manufactured according to Example 1 are dissolved in 1,000 parts of water. A cotton fabric is padded with this solution and squeezed out to a weight decrease of 90%. The cotton, whilst still moist, is treated for 30 minutes at 70° in a bath which contains 300 parts of calcined sodium sulphate and 10 parts of calcined sodium carbonate dissolved in 1,000 parts of water. Thereafter the dyeing is finished in the usual manner. A greenish-tinged turquoise-blue dyeing of excellent fastness to wet processing and to light is obtained.

DYEING INSTRUCTION 168 ml of water at 20° – 25° are initially introduced into a dyeing beaker of 300 ml capacity contained in a water bath which can be heated. 0.3 g of the dyestuff obtained according to Example 1 is thoroughly worked into a paste with 2 ml of cold water and 30 ml of hot water (70°) are added; hereupon, the dyestuff dissolves. The dyestuff solution is added to the water initially introduced and 10 g of cotton yarn are constantly agitated in this dyeing liquor. The temperature of the dyeing liquor is raised to 70° – 80° over the course of 10 minutes, 10 g of anhydrous sodium sulphate are added and dyeing is continued for 30 minutes. 4 g of anhydrous sodium carbonate are then added to the dyeing liquor and dyeing is carried out for 60 minutes at 70° – 80°. The dyed material is then removed from the dyeing liquor, the adhering liquor is removed by wringing out or squeezing out, and the material is rinsed. A strong turquoise-blue dyeing of good fastness to light and to wet processing is obtained.

Equally valuable dyestuffs of the formula I are obtained if the instructions of Example 1 are followed but the modifications listed in the table which follows are made. X indicates the position of the substituents in the phthalocyanine nucleus. The last column of the table gives the colour shades of the prints on mercerised cellulose.

| Example | Me | x | a | b | c | HOOC-⟨aryl⟩-NH- | Z | Colour shade |
|---|---|---|---|---|---|---|---|---|
| 2 | Cu | 3 | 2 | 0 | 2 | (4-COOH-3-methylphenyl)-NH- | 2,4-difluoro-5-chloropyrimidinyl-6 | greenish-tinged turquoise |
| 3 | Cu | 3 | 2 | 0 | 2 | (4-COOH-2-methylphenyl)-NH- | " | strongly greenish-tinged turquoise |
| 4 | Cu | 3 | 2 | 0 | 1 | (4-COOH-3-methylphenyl)-NH- | " | greenish-tinged turquoise |
| 5 | Cu | 3 | 2 | 0 | 1 | " | 2,4-dichlorotriazinyl-6 | " |
| 6 | Cu | 3 | 2 | 0 | 2 | " | 2,4,5-trichloropyrimidinyl-6 | " |
| 7 | Ni | 3 | 2 | 0 | 2 | " | " | green |
| 8 | Ni | 3 | 2 | 0 | 2 | " | 2,3-dichloroquinoxaline-6-carbonyl | " |
| 9 | Ni | 3 | 2 | 0 | 2 | (4-COOH-3-methylphenyl)-NH- | 2,4-difluoro-5-chloropyrimidinyl-6 | " |
| 10 | Ni′ | 3 | 2 | 0 | 2 | " | 2-chloro-4-amino-triazinyl-6 | " |
| 11 | Cu | 4 | 3 | 0 | 1 | " | 2,4-difluoro-5-chloropyrimidinyl-6 | turquoise |

EXAMPLE 19

97 parts of the copper phthalocyaninetetrasulphonyl chloride manufactured in a known manner (see DAS (German Published Specification) No. 1,205,639, Example 1) by post-treatment with thionyl chloride are suspended in 1,000 parts of ice water and neutralised with sodium hydroxide solution. 38.8 parts of 1-amino-2-carboxy-5-acetaminobenzene are dissolved in 200 parts of water at pH 9. This solution, together with 10.6 parts of ammonium chloride, is added to the aqueous suspension of the copper phthalocyaninetetrasulphonyl chloride and the mixture is warmed to 20°. The condensation is completed at this temperature, whilst maintaining a pH of 9 by simultaneous dropwise addition of sodium hydroxide solution. The nitrite determination shows that approx. 60% of the aminoacetaminobenzoic acid employed have been reacted. The dyestuff present in solution has the following average composition:

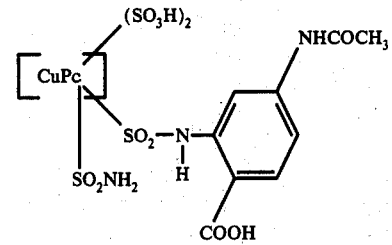

To saponify the acetylamino group, sufficient parts of sodium hydroxide are added to produce an approx. 2 N sodium hydroxide solution and the mixture is then warmed to 90° – 95° for one hour. After cooling, the solution is adjusted to pH 9 by adding concentrated hydrochloric acid and the dyestuff is salted out with 10% by volume of sodium chloride and is filtered off.

The moist paste is dissolved in 1,000 parts of ice water. 18 parts of 2,4,6-trifluoro-5-chloropyrimidine are added dropwise at pH 8 and 5°. The pH is kept constant by simultaneously adding 10% strength sodium carbonate solution. During the acylation of the dyestuff in part precipitates. After completion of the acylation it is completely separated out by adding 5% by volume of sodium chloride. After filtration, drying and grinding, a blue powder which is readily soluble in water is obtained. In the form of the free acid, the dyestuff corresponds to the following formula:

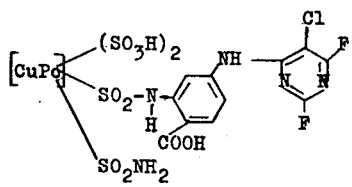

The dyestuff obtained in accordance with this process gives a distinctly redder colour shade by the dyeing process described in the appendix to Example 1 and shows greater affinity than the dyestuff obtained according to Example 1.

If the instructions of Example 19 are followed but the reactants are changed, as indicated in the table which follows, valuable dyestuffs are again obtained, the colour shades of which are listed in the last column.

longer at 90° – 95° to complete the formation of the sulphochloride. After cooling to 25°, the melt is added to a mixture of ice and a little water, the mixture is filtered and the filter residue is washed with ice water until neutral to Congo Red.

The resulting paste of the copper phthalocyanine-(3,3',3'',3''')-tetrasulphonic acid chloride is stirred into 1,000 parts of ice water and the pH value of the suspension is adjusted to 7.0 with sodium hydroxide solution. Thereafter, a solution of 27 parts of 2-amino-5-acetylamino-benzoic acid in 125 parts of water, which has been adjusted to pH 7, is allowed to run in. The temperature of the suspension (or solution) is now raised to 40° over the course of about 5 hours and whilst doing so the pH value is initially kept at 6.5 – 7.0 with 150 ml of 1 N ammonia and subsequently at about 10 with sodium hydroxide solution. Thereafter the solution is briefly warmed to 80° to saponify remaining sulphonic acid chloride groups.

To saponify the acetyl group, 800 parts of hydrochloric acid (36% strength) are added and the resulting suspension is stirred at about 90° until the reaction is complete, the mixture is filtered and the filter residue is repeatedly rinsed with water.

The resulting dyestuff intermediate product is dissolved in 1,300 ml of water at a pH value of 7, with the aid of sodium hydroxide solution. At about 20°, 23 parts of trifluorochloropyrimidine are slowly added dropwise and the pH value of the solution is kept at 6.5 – 7.0 with 1 N sodium hydroxide solution until the

| Example | Me | x | a | b | c | $R_1$ | $R_2$ | HOOC–⟨phenyl⟩–NH– | Z | Colour shade |
|---|---|---|---|---|---|---|---|---|---|---|
| 20 | Cu | 3 | 2 | 1 | 1 | H | H | HOOC–⟨phenyl⟩–NH– | 2,4-difluoro-5-chloro-pyrimidinyl-6 | Turquoise |
| 21 | Cu | 3 | 2 | 1 | 1 | $CH_3$ | $CH_3$ | " | " | " |
| 22 | Cu | 3 | 2 | 1 | 1 | $CH_3$ | $CH_2$—$CH_2OH$ | " | " | " |
| 23 | Cu | 3 | 2 | 1 | 1 | H | H | HOOC–⟨phenyl⟩–NH– | 2,3-dichloro-quinoxaline-6-carbonyl | " |
| 24 | Cu | 3 | 2 | 1 | 1 | H | H | " | 2,4-dichloro-triazinyl-6 | " |
| 25 | Cu | 3 | 2 | 1 | 1 | H | H | " | 2,4-difluoro-5-chloro-pyrimidinyl-6 | " |
| 26 | Cu | 3 | 1 | 1 | 1 | H | H | " | " | " |

EXAMPLE 27

57.5 parts of copper phthalocyanine in 215 parts of chlorosulphonic acid are treated for 4 hours at 137° –139°. Thereafter the melt is cooled to 85°, 98 parts of thionyl chloride are slowly added dropwise at this temperature and the mixture is stirred for some hours reaction is complete. The resulting dyestuff is precipitated by adding 500 parts of saturated sodium chloride solution and the product is filtered off and briefly rinsed with water.

After drying, a blue readily water-soluble powder is obtained in almost quantitative yield. In the form of the free acid, the dyestuff corresponds to the formula

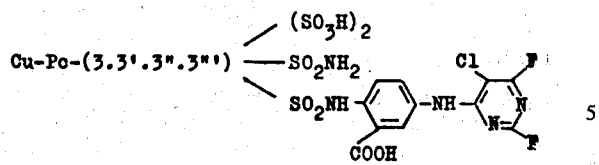

If the 2-amino-5-acetylamino-benzoic acid mentioned in paragraph 2 is replaced by the equimolecular amount of 2-amino-4-acetylamino-benzoic acid and in other respects the procedure described above is followed, a blue readily water-soluble powder is again obtained in almost quantitative yield. In the form of its free acid, the dyestuff corresponds to the formula

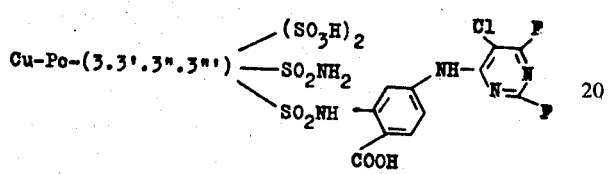

The two dyestuffs described give a distinctly redder colour shade in accordance with the printing and dyeing processes described in the appendix to Example 1, and show a better affinity than the dyestuff obtained according to Example 1.

We claim:
1. Phthalocyanine reactive dyestuff of the formula

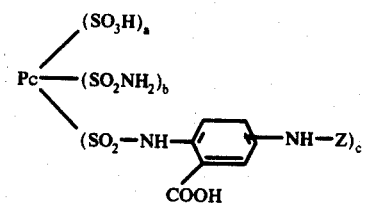

wherein
Pc is selected from the group consisting of phthalocyanine, copper phthalocyanine, cobalt phthalocyanine and nickel phthalocyanine where a and c each is a number from 1 to 3 and b is a number from 0 to 2 provided that sum of a, b and c is not greater than 4; and Z represents a fiber-reactive group selected from the group consisting of dihalogenpyrimidinyl, trihalogenpyrimidinyl, 2-methyl-sulfonyl-5-chloro-6-methylpyrimidinyl and 2,3-dichloroquinoxaline-6-carbonyl.

2. Phthalocyanine reactive dyestuff of claim 1, wherein
Z represents a 2,6-difluoro-5-chloro-4-pyrimidinyl radical.

3. Dyestuff of claim 1 of the formula

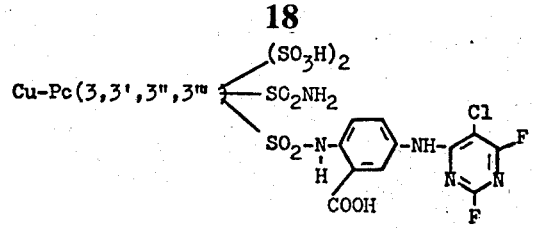

4. Dyestuff of claim 1 of the formula

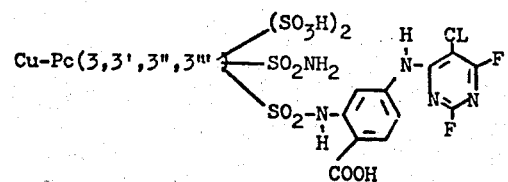

5. Dyestuff of claim 1 of the formula

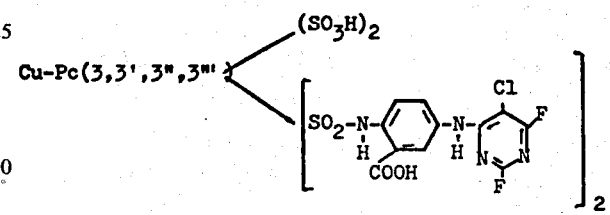

6. Dyestuff of claim 1 of the formula

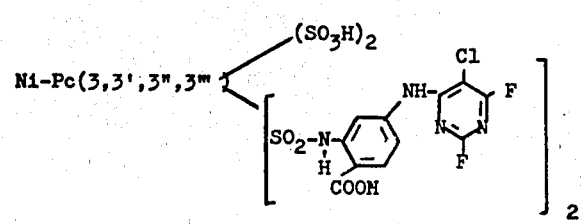

7. Dyestuff of claim 1 of the formula

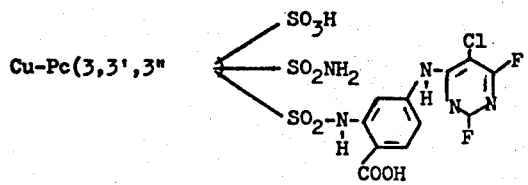

* * * * *

UNITED STATES PATENT AND TRADEMARK OFFICE
CERTIFICATE OF CORRECTION

PATENT NO. : 3,989,692
DATED : November 2, 1976
INVENTOR(S) : HORST JAGER et al

It is certified that error appears in the above-identified patent and that said Letters Patent are hereby corrected as shown below:

Column 9, line 10, delete the formula and insert the following:

Columns 13 and 14, after Example 11, insert the following Examples 12-18 which were omitted:

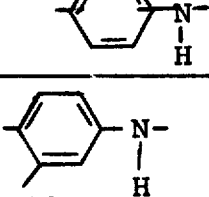

| Example | Me | x | a | b | c | HOOC-⌬-N(H)- | z | Colour Shade |
|---|---|---|---|---|---|---|---|---|
| 12 | Cu | 4 | 3 | 0 | 1 | (structure with COOH) | 2,4-difluoro-5-chloropyrimid-inyl-6 | turquoise |
| 13 | Cu | 3 | 3 | 0 | 1 | " | " | strongly greenish-tinged turquoise |

UNITED STATES PATENT AND TRADEMARK OFFICE
CERTIFICATE OF CORRECTION

PATENT NO. : 3,989,692
DATED : November 2, 1976
INVENTOR(S) : HORST JAGER et al

It is certified that error appears in the above-identified patent and that said Letters Patent are hereby corrected as shown below:

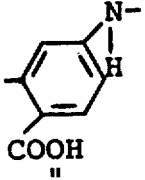

| | | | | | | | |
|---|---|---|---|---|---|---|---|
| 14 | Cu | 3 | 2 | 0 | 2 | β-Sulphatoethyl-sulphonyl | Greenish-tinged turquoise |
| 15 | Cu | 3 | 2 | 0 | 2 | " 2,4-dichloro-pyrimidine-5-carbonyl | " |
| 16 | Cu | 3 | 2 | 0 | 2 | " 2-methylsul-phonyl-5-chloro-6-methyl-pyrimidinyl-4 | " |
| 17 | Cu | 3 | 2 | 0 | 2 | " 2-methylsulphonyl-benzthiazole-5-carbonyl | " |
| 18 | Cu | 3 | 2 | 0 | 2 | " 3-(4',5'-dichloro-pyridazon-6'-yl-1')-benzenecarbonyl | " |

Signed and Sealed this

Fifteenth Day of November 1977

[SEAL]

Attest:

RUTH C. MASON
Attesting Officer

LUTRELLE F. PARKER
Acting Commissioner of Patents and Trademarks